United States Patent
Benthien et al.

(10) Patent No.: US 11,137,004 B2
(45) Date of Patent: Oct. 5, 2021

(54) COUPLING MEMBER AND COUPLING SYSTEM, AND A METHOD FOR COUPLING TWO MODULES WITH EACH OTHER, AND AN AIRCRAFT

(71) Applicant: Airbus Operations GmbH, Hamburg (DE)

(72) Inventors: Hermann Benthien, Hamburg (DE); Danny Dicks, Hamburg (DE); David Kaden, Hamburg (DE); Bastian Schäfer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 571 days.

(21) Appl. No.: 16/100,910

(22) Filed: Aug. 10, 2018

(65) Prior Publication Data
US 2019/0048908 A1 Feb. 14, 2019

(30) Foreign Application Priority Data
Aug. 10, 2017 (DE) ...................... 10 2017 118 251.9

(51) Int. Cl.
| | | |
|---|---|---|
| *F16B 5/00* | (2006.01) | |
| *F16D 1/112* | (2006.01) | |
| *F16B 7/20* | (2006.01) | |

(52) U.S. Cl.
CPC .............. *F16B 5/0092* (2013.01); *F16B 7/20* (2013.01); *F16D 1/112* (2013.01); *Y10T 403/7007* (2015.01)

(58) Field of Classification Search
CPC ....... B64C 1/00; B64C 39/024; F16B 5/0092; F16B 5/07; F16B 5/10; F16B 7/20;
(Continued)

(56) References Cited

U.S. PATENT DOCUMENTS

| | | | | |
|---|---|---|---|---|
| 1,241,118 A | * | 9/1917 | Hoskins ..................... | F16D 3/18 464/157 |
| 2,425,809 A | * | 8/1947 | Johnson ..................... | F16D 3/16 464/157 |

(Continued)

FOREIGN PATENT DOCUMENTS

| | | |
|---|---|---|
| DE | 691 14 888 T2 | 4/1996 |
| DE | 694 06 610 T2 | 3/1998 |

(Continued)

OTHER PUBLICATIONS

German Search Report, dated Jul. 25, 2018 priority document.
European Search Report for corresponding European Patent Application No. 18187849.7.

*Primary Examiner* — Josh Skroupa
(74) *Attorney, Agent, or Firm* — Greer, Burns & Crain, Ltd.

(57) ABSTRACT

A coupling member for coupling modules with each other. The coupling member comprises a coupling portion, which in turn has a coupling rim and at least two hook members disposed on the coupling rim. The coupling portion substantially corresponds in its outer contour to a spherical segment of a sphere with a predetermined spherical radius, wherein the coupling rim represents a circular disk of the spherical segment. In this case, an outer radius of the coupling rim is smaller than or equal to the spherical radius. The at least two hook members, in a lateral view, at least partially follow the outer contour of the spherical cap of the spherical segment. The at least two hook members are engageable with the hook members of a coupling portion of a second coupling member.

11 Claims, 3 Drawing Sheets

(58) Field of Classification Search
CPC .. F16B 7/22; F16B 21/02; F16B 21/04; F16D 1/112; F16D 3/16; Y10T 403/58; Y10T 403/587; Y10T 403/7005; Y10T 403/7007; Y10T 403/7015; Y10T 403/7045; Y10T 403/7092
USPC ....... 403/315, 319, 348, 349, 353, 364, 380, 403/DIG. 4; 464/159
See application file for complete search history.

(56) References Cited

U.S. PATENT DOCUMENTS

| | | | | |
|---|---|---|---|---|
| 2,928,263 | A * | 3/1960 | Devos | F16D 3/24 |
| | | | | 464/142 |
| 4,280,339 | A * | 7/1981 | Stuemky | F16D 3/02 |
| | | | | 403/364 |
| 4,400,856 | A | 8/1983 | Tseng | |
| 4,634,202 | A | 1/1987 | Taylor | |
| 4,660,913 | A | 4/1987 | Turner | |
| 4,840,601 | A * | 6/1989 | Denman | F16D 3/16 |
| | | | | 464/157 |
| 4,968,173 | A * | 11/1990 | Fujita | F16D 3/44 |
| | | | | 403/57 |
| 5,073,145 | A * | 12/1991 | Ratzokwski | F16D 3/16 |
| | | | | 464/157 |
| 5,104,070 | A | 4/1992 | Johnson et al. | |
| 5,332,001 | A | 7/1994 | Brown | |
| 5,333,915 | A | 8/1994 | Sparling et al. | |
| 5,658,159 | A | 8/1997 | Gardner et al. | |
| 5,779,277 | A | 7/1998 | Street | |
| 6,135,743 | A * | 10/2000 | Keikov | F04C 3/06 |
| | | | | 418/195 |
| 6,354,540 | B1 | 3/2002 | Lewis et al. | |
| 7,108,444 | B2 * | 9/2006 | Burgstaler | F16C 11/02 |
| | | | | 403/364 |
| 7,674,064 | B2 | 3/2010 | Nakamura et al. | |
| 7,967,684 | B1 * | 6/2011 | Schroeder | F16D 3/16 |
| | | | | 464/139 |
| 9,623,949 | B2 | 4/2017 | Heppe | |
| 9,853,386 | B1 | 12/2017 | Lee et al. | |
| 9,895,562 | B2 | 2/2018 | Richardson | |
| 10,495,153 | B2 * | 12/2019 | Goulet | F16D 1/02 |
| 2003/0013337 | A1 | 1/2003 | Crossan et al. | |
| 2004/0201215 | A1 | 10/2004 | Steingass | |
| 2017/0015443 | A1 | 1/2017 | Lakshmanan et al. | |
| 2017/0066506 | A1 | 3/2017 | Klein | |

FOREIGN PATENT DOCUMENTS

| | | |
|---|---|---|
| DE | 21 2010 000 149 U1 | 5/2012 |
| DE | 10 2013 000 409 A1 | 7/2014 |
| DE | 10 2014 104 695 A1 | 10/2015 |
| KR | 10 2018 0 000 488 A | 1/2018 |
| NL | 7705810 A | 11/1978 |

* cited by examiner

COUPLING MEMBER AND COUPLING SYSTEM, AND A METHOD FOR COUPLING TWO MODULES WITH EACH OTHER, AND AN AIRCRAFT

CROSS-REFERENCES TO RELATED APPLICATIONS

This application claims the benefit of the German patent application No. 10 2017 118 251.9 filed on Aug. 10, 2017, the entire disclosures of which are incorporated herein by way of reference.

FIELD ON THE INVENTION

The invention relates to a coupling member for coupling modules with each other, a coupling system, and a method for coupling two modules with each other, and an aircraft.

BACKGROUND OF THE INVENTION

Unmanned aerial vehicles, so-called drones, are known from the prior art. Several of these drones may be mechanically coupled to one another as respective modules in order to form a drone assembly, or even a so-called drone swarm.

Thus, DE102013000409, for example, discloses an airborne platform consisting of different individual modules. This airborne platform is capable of taking off and landing vertically and of flying autonomously. Here, the airborne platform includes at least one drive and control module as well as further modules that can be coupled to the drive and control module depending on the purpose of the airborne platform. In this case, each module includes a mechanical as well as, preferably, also an electrical interface via which the drive and control module can be assembled directly or indirectly for forming the airborne platform.

Further, DE102014104695 discloses an androgynous coupling device for connecting modules, particularly for constructing a spacecraft of modular design.

SUMMARY OF THE INVENTION

An object on which the invention is based is to provide a genderless or androgynous coupling member which enables two or more modules to be coupled with each other as easily and reliably as possible.

According to a first aspect, the invention is characterized by a coupling member for coupling modules with each other. The coupling member comprises a coupling portion, which in turn has a coupling rim and at least two hook members disposed on the coupling rim. The coupling portion substantially corresponds in its outer contour to a spherical segment of a sphere with a predetermined spherical radius. The coupling rim represents a circular disk of the spherical segment. In this case, an outer radius of the coupling rim is smaller than or equal to the spherical radius. The at least two hook members, in a lateral view, at least partially follow the outer contour of the spherical cap of the spherical segment, wherein the at least two hook members are engageable with the hook members of a coupling portion of a second coupling member.

The coupling member is configured so as to be genderless or androgynous as such. That is, a coupling member may be coupled to another, identical coupling member. Here, a module, which may be configured, for example, as an aircraft such as a drone, includes one or more of these coupling members.

The coupling member includes the coupling portion which, viewed in all three dimensions of its outer contour, substantially corresponds to the spherical segment of the sphere.

From the fact that the coupling portion of a module is engageable with the coupling portion of another module, it can be derived that such a coupling member is formed so as to be genderless. The spherical cap-like shape of the respective coupling portion permits self-centering of the coupling portions to be coupled relative to one another.

In an advantageous embodiment of the first aspect, the coupling portion has a concave recess which, in a coupled state, corresponds in its shape at least partially to the contour of the spherical cap of a coupled coupling member. This permits a reliable and self-centering coupling between modules that each comprise a coupling member.

In another advantageous embodiment of the first aspect, the respective hook member has a lower leg and an upper leg disposed thereon. The lower leg is attached to the coupling rim. The respective lower and upper legs are arranged relative to one another in such a way that together they form one hook, respectively. The at least two hook members are disposed in the shape of a circle around a center point of the coupling rim.

The at least two hook members have an identical radial distance from the center point of the coupling rim. The hook members are configured and dimensioned in such a way that hook members of different modules are able to interlock. Thus, forces in the longitudinal direction between the coupled modules can be absorbed in the coupled state by means of the coupling member. Because of the concave recess of the coupling member and the simultaneously fitting convex outer contour of the coupling member of a coupled module, which is formed by the hook members, it is possible also to additionally absorb forces in the transverse direction between the modules in the coupled state. That is, the hook members form the central component for being able to absorb forces in the longitudinal and transverse directions between the coupled modules.

In another advantageous embodiment of the first aspect, an axis through the center point of the circular disk of the spherical segment and through the center point of the sphere forms a rotational axis around which the at least two hook members are disposed so as to be radially spaced apart and rotatable. Because of the rotation of the hook members of the modules to be coupled relative to one another, the latter interlock. A reliable coupling can thus be made possible.

In another advantageous embodiment of the first aspect, the coupling portion comprises a locking member, which is displaceable parallel to the rotational axis into the recess and is configured to block a rotation of the hook members of the two modules relative to each other in a coupled state. Modules can thus be reliably coupled to one another.

In addition, the respective locking member of a coupling member may have additional power and/or data interfaces. Configured in this manner, the locking members are able to approach one another with the linear displacement parallel to the rotational axis required for locking, in such a way that a power and/or data transmission between coupled modules is enabled by means of power and/or data interfaces.

In another advantageous embodiment of the first aspect, at least the coupling portion is produced by additive manufacturing. Due to its complex form and functionality, the coupling portion of the coupling member can be manufactured in conventional manufacturing processes only with difficulty. Using additive manufacturing methods, at least the coupling portion can be manufactured reliably and cost-effectively.

According to a second aspect, the invention is characterized by a coupling system with a coupling member of a first module and a coupling member of a second module, wherein both coupling members are each configured in accordance with the first aspect. In a coupled state, the rotational axes of both coupling members conform to each other. The hook members of the coupling member of the first module engage the hook members of the coupling member of the second module and vice versa.

The coupling member according to the first aspect is configured so as to be androgynous, i.e., genderless. If modules are each equipped with at least one coupling member, then all such modules can be coupled to one another without requiring changes to the design of the respective coupling member. Here, the respective module may be configured as a movable object or also as a stationary object. Thus, the coupling by means of the coupling members also covers all possible constellations of the module designs.

In an advantageous embodiment of the second aspect, in a coupled state, the locking member of at least one coupling member is displaceable parallel to the rotational axis in the direction towards the coupled coupling member. Here, the locking member is configured to block a rotary movement of the coupled coupling member relative to the other coupling member. A reliable coupling between modules is thus made possible.

According to a third aspect, the invention is characterized by a method for coupling two modules with each other, wherein each module has a coupling member according to the first aspect. In the method, a distance and/or a position of a module relative to the other module is detected. Depending on the detected distance and/or the detected position of the modules relative to each other, the hook members of the coupling member of the first module are inserted into the recess of the coupling member of the second module and vice versa. Then, the hook members of the coupling member of the first module are rotated, relative to the hook members of the coupling member of the second module and vice versa, by a predetermined angle about the rotational axis. Depending on the rotation of the hook members, at least one locking member of a module is moved linearly along its rotational axis, so that a rotation of the hook members of both modules relative to one another is blocked. A coupling between modules can be initiated and achieved by means of the method. Here, a coupling may preferably be reliably initiated only when the distance and/or the position of the modules fit each other, i.e., preferably the two modules oppose each other substantially exactly. This is preferably the case if the rotational axes of both modules conform to each other.

Alternatively, the two locking members may also be moved linearly along the associated rotational axes. If the respective locking member of a coupling member additionally has power and/or data interfaces, then the power and/or data interfaces may be coupled simultaneously with the linear movement of the two locking members. Thus, a power and/or data transmission may then take place between the coupled modules.

BRIEF DESCRIPTION OF THE DRAWINGS

The aspects described above and further aspects, features and advantages of the invention may also be gathered from the examples of the embodiments, which will be described below with reference to the attached drawings.

DETAILED DESCRIPTION OF THE PREFERRED EMBODIMENTS

Figure 1:
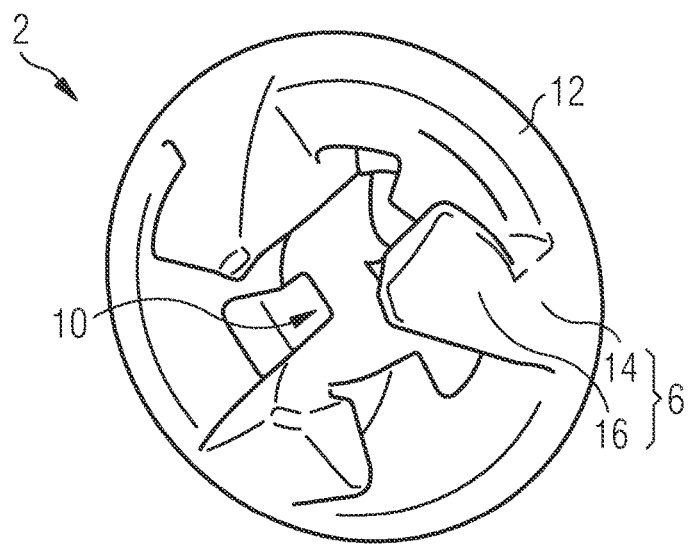
FIG. 1 is an illustration of a coupling member.

Identical reference numerals are used in the Figures for identical or at least similar elements, components or aspects. It is noted that embodiments are described in detail hereinbelow which are merely illustrative and non-limiting.

FIG. 1 shows a three-dimensional illustration of a coupling member 2. It may be a part of a module (not shown in FIG. 1) for coupling to other modules therewith. A module may be configured, for example, as an aircraft such as a drone.

Figure 2A:
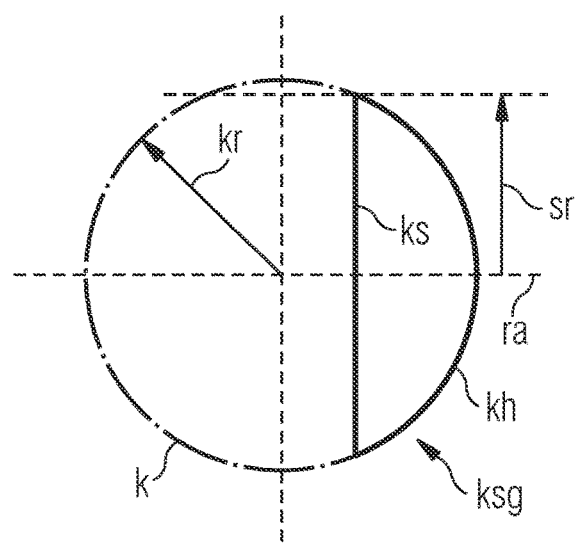
FIGS. 2a, 2b are illustrations of a spherical segment in relation to the coupling member.

FIG. 2a shows a sectional view of a sphere k with a highlighted spherical segment. This illustration serves as a reference for describing the coupling member 2.

The sphere k has a predetermined spherical radius kr. Furthermore, a spherical segment ksg, which comprises a circular disk ks and a spherical cap kh, is depicted in the sphere k. While the sphere k and the spherical segment ksg as such each represent three-dimensional bodies, the circular disk ks is formed as a two-dimensional component of the spherical segment ksg. A disk radius sr is to be considered, in the plane of the circular disk ks, as the distance between the center point of the circular disk ks and the envelope of the sphere k. The spherical cap kh extends as a three-dimensional shape along the envelope of the sphere k to the circular disk ks.

Figure 2B:
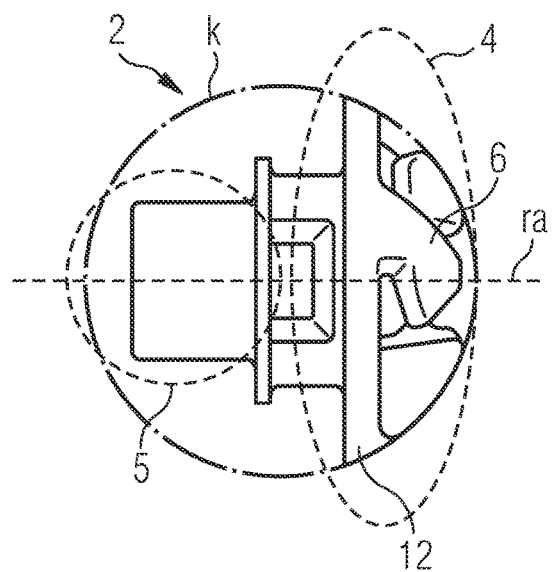

FIG. 2b depicts the coupling member 2 comprising a coupling portion 4 in the sphere k with a predetermined spherical radius kr. The coupling portion 4 has an outer contour corresponding to the spherical segment ksg of the sphere k. Here, the coupling portion 4 is formed of a coupling rim 12 and three hook members 6 disposed thereon. The coupling rim 12 substantially represents the sphere disk ks, and the hook members 6, in a lateral view, extend at least partially along the envelope of the sphere k and thus represent the shape of the spherical cap kh. An outer radius of the coupling rim 12, which also corresponds to the disk radius sr of the circular disk ks of the spherical segment, is smaller than the spherical radius kr. A rotational axis ra extends through the center point of the circular disk ks or of the coupling rim 12 and a center point of the sphere k.

In addition to the coupling portion 4, the coupling member 2 comprises a closure portion 5. The closure portion 5 is mechanically coupled to the coupling portion 4. If the coupling member 2 is rotatably attached to the associated module, the coupling portion 4 can be rotated about the rotational axis ra by means of the closure portion 5.

As shown in FIG. 1, a respective hook member 6 is formed of a lower leg 14 and an upper leg 16. The lower leg 14 is attached to the coupling rim 12. The upper leg 16 is disposed on an end of the lower leg 14 facing away from the coupling rim 12 in such a way that the two legs 14, 16 form a hook. The three hook members 6 are disposed in the shape of a circle around the center point of the coupling rim 12. Furthermore, the hook members 6 have an identical radial distance from the rotational axis ra. The coupling member 2 may have two or more than two hook members 6.

The coupling member 2 further comprises a recess 10 encircled by the hook members 6. The recess 10 has a shape suitable for accommodating the hook members 6' of a second coupling member 2'. Thus, the recess 10 has an inwardly curved, i.e., concave, shape which is configured for accommodating the outwardly curved and thus convex coupling portion 4' of the second coupling member 2' formed by the hook members 6' (see FIG. 4).

A coupling member 2 configured in this manner represents a genderless or androgynous coupling member, i.e., identically configured coupling members 2 can be coupled to one another.

Figure 3A:
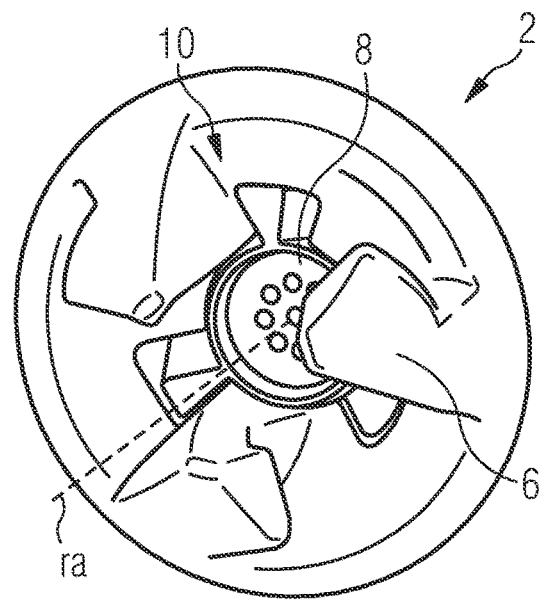
FIGS. 3a, 3b show the coupling member with a lock.
Figure 3B:
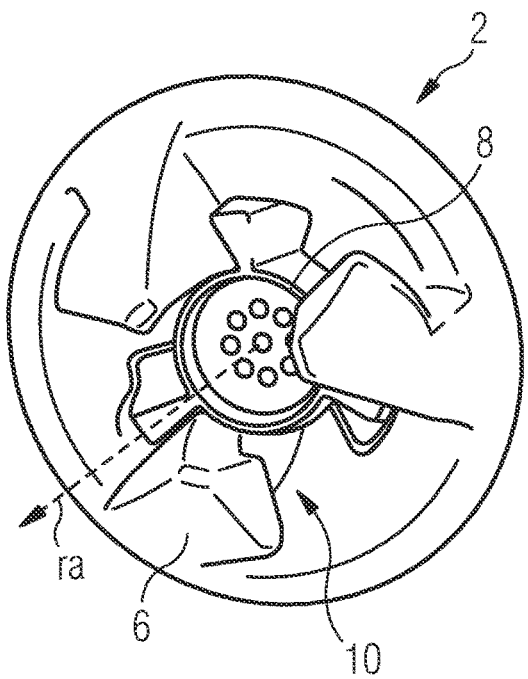
Figure 4:
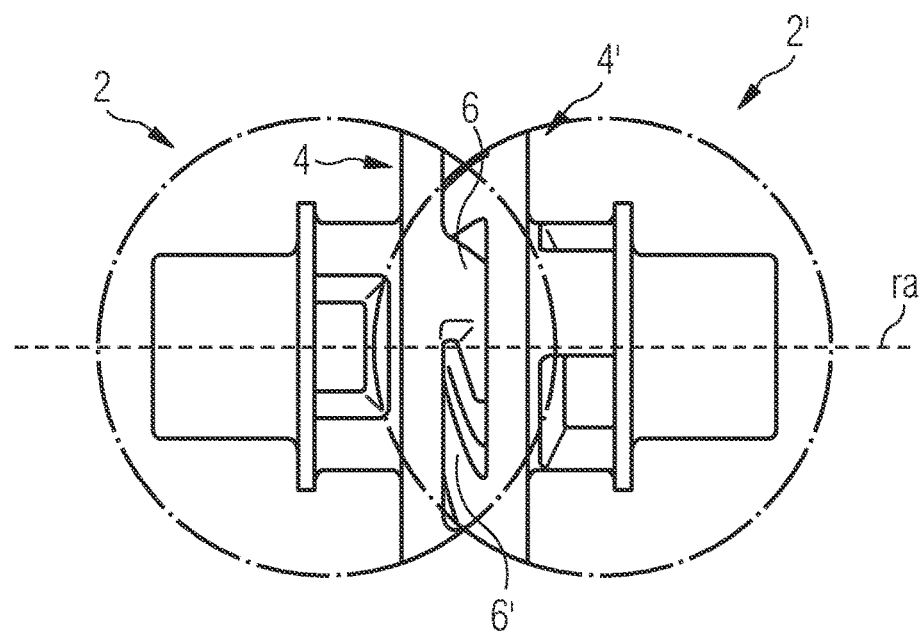
FIG. 4 shows the coupled coupling members.

A coupling member 2 with a locking member 8 is shown in two configurations in FIGS. 3a and 3b. The locking member 8 is disposed centrally in the recess 10 and displaceable along the rotational axis ra. Thus, the locking member 8 is retracted in FIG. 3a, and extended in FIG. 3b. In this context, extended means a linear movement of the locking member 8 parallel to the rotational axis ra in such a way that the locking member 8 at least partially protrudes into the recess 10 of the associated coupling member 2. Then, retracted means a movement parallel to the rotational axis ra in such a way that the locking member 8 does not protrude into the recess of the associated coupling member 2. If, therefore, two coupling members 2, 2' are in a coupled state (as shown in FIG. 4), i.e., the respective hook members 6, 6' are interlocked, the respective locking member 8 can be extended. In an extended state, the locking member 8 is configured to block a rotation of the hook members 6, 6' relative to each other about the rotational axis ra. For this purpose, it is sufficient if the locking member 8 of at least one coupling member 2, 2' is extended.

In addition, the respective locking member 8 of a coupling member 2 may have power and/or data interfaces. Configured in this manner, the locking members 8, while two modules are being coupled, are able to approach one another with the linear displacement parallel to the rotational axis ra required for locking, in such a way that a power and/or data transmission between the coupled modules is enabled by means of power and/or data interfaces.

Figure 5:
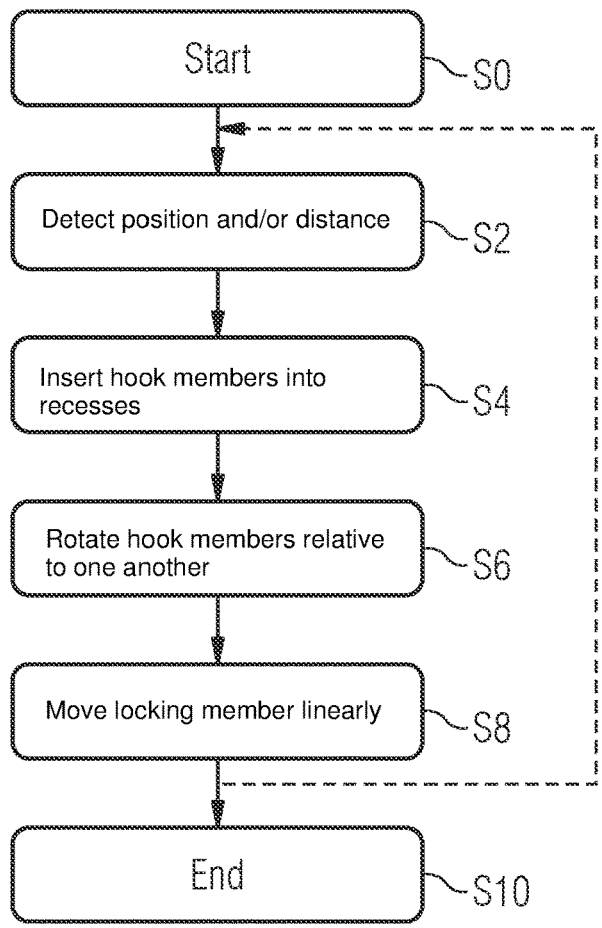
FIG. 5 shows a process sequence.

FIG. 5 shows a process sequence for coupling two modules with each other. The modules to be coupled each comprise a coupling member 2, 2'. The method may be executed by a control and regulating unit of the respective module, for example. Here, the method is preferably executed in parallel by both modules to be coupled.

The method is started in a step S0. In a step S2, a distance and/or a position of a module relative to the other module is detected. For this purpose, the respective module may have at least one proximity or distance sensor (not shown), by means of which the position and/or the distance can be detected. The distance and/or position of the modules relative to one another are preferably detected in parallel by both modules to be coupled. Depending on the respectively detected distance and/or position, the further steps can thus be executed in parallel by both modules.

In a step S4, depending on the detected distance and/or the detected position of the modules relative to each other, the hook members 6 of the coupling member 2 of the first module are inserted into the recess of the coupling member 2' of the second module and vice versa.

Ideally, the rotational axes ra of the two modules are identical in this case. Here, the coupling member is configured in such a way that an insertion of the hook members 6, 6' into the respective recess 10 is possible even in the case of a slight deviation in the alignment of the rotational axes ra relative to one another. The possible deviation in this case depends on the number of the hook members 6, 6' per coupling member 2, 2' and the alignment of the hook members 6, 6' relative to one another prior to insertion. In principle, the deviation in the alignment of the rotational axes ra relative to one another may be assumed to be the bigger the smaller the number of the hook members 6, 6' of the respective coupling member 2, 2'.

Then, in a step S6, the hook members 6 of the coupling member 2 of the first module are rotated, relative to the hook members 6' of the coupling member 2' of the second module and vice versa, by a predetermined angle about the rotational axis ra. It must be ensured in this step, however, that the rotational axes ra of the two coupling members to be coupled are identical as regards their alignment. Otherwise, an interlocking rotation of the hook members 6, 6' relative to each other is not possible.

Preferably, the respective coupling member 2, 2' is rotatably attached to the associated module 1, 1'. In this case, the closure portion 5 of the coupling members 2, 2' can be acted upon by means of a transmission, for example, in order to rotate the coupling portion 4 by the predetermined angle about the rotational axis ra.

The angle of the necessary rotation about the rotational axis ra until interlock depends on the number of the hook members 6, 6' per coupling member 2, 2'. In principle, the angle may be assumed to be the bigger the smaller the number of the hook members 6, 6' of the respective coupling member 2, 2'.

In a step S8, the locking member 8 of at least one module is moved linearly for a predetermined distance parallel to the alignment of the rotational axis ra. In the extended state, the locking member 8 serves as a block of a rotation of the coupling members 2, 2' relative to each other.

Alternatively, both locking members of the coupled modules may also be extended, whereby an increased reliability of the coupling of the two modules 1, 1' is provided.

FIG. 4 shows two coupling members 2, 2' in a coupled state.

With the step S8, the coupling of the two modules 1, 1' is completed, and the method may be terminated in a step S10.

Figure 6:
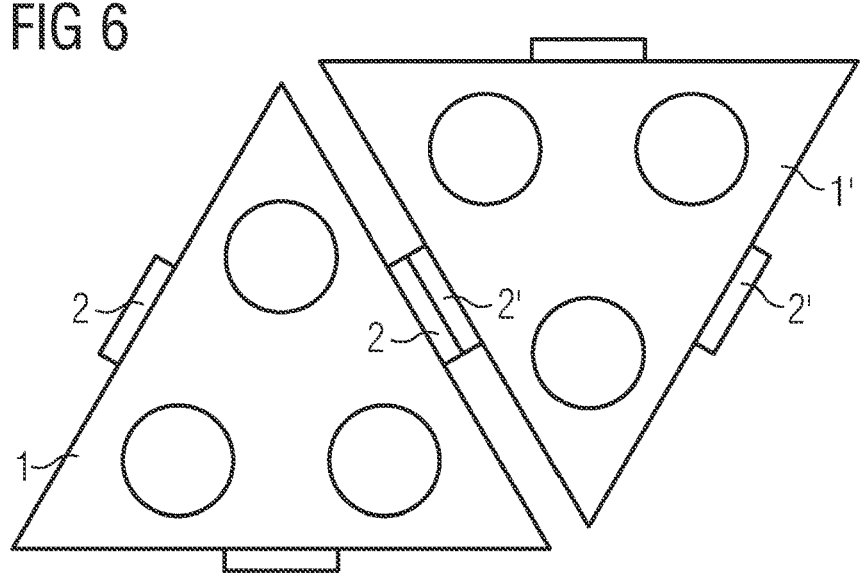
FIG. 6 shows an aircraft configuration.

FIG. 6 shows two drones in an aircraft configuration. In this case, each drone represents a module configured as an aircraft. The respective drone has a triangular shape, with other shapes also being possible in principle, such as hexagonal or rectangular shapes.

Each drone comprises three drive units, respectively, each of which is configured as an electrically driven propeller, for example. In principle, the drone may also have more or fewer drive units. Also, each drone has one coupling member 2, 2', respectively, on each of its sides.

The two drones can be coupled to each other by means of the coupling members 2, 2', as shown in FIG. 6. Thus, a drone configuration consisting of two individual drones can be prepared from two separate and mutually independent drones. By means of the option of exchanging power and/or data by means of the energy and/or data interfaces subsequent to coupling, this drone configuration can also be controlled as a single drone.

Alternatively or additionally, more than two drones can be coupled to one another by means of the associated coupling members. In this case, a different function may be assigned to each drone of this new drone configuration. For example, a drone with a drive unit may also be equipped, as a passive module without its own drive unit, with corresponding energy storage devices and thus supply one or more drones with the required power by means of the energy interfaces. Another drone of this configuration may have sensors or control units, for example. And other drones may be configured specially for accommodating or transporting cargo.

Furthermore, each coupling member, in addition to the rotation about the rotational axis required for coupling, may additionally be pivotably attached to the associated module. Taking the drone configuration as an example, some drones may thus also be orientated perpendicularly relative to one another. This is particularly advantageous if the drives as such are configured so as to be pivotable in the respective module, e.g., as pivotable engine pods.

In principle, however, coupling by means of the coupling members is suitable not only for drones, but for any form and design of aircraft.

While the invention was illustrated and described in detail in the drawings and the preceding description, such illustrations and descriptions are intended to be illustrative or exemplary only, and not restrictive, so that the invention is not limited by the embodiments disclosed. In the claims, the word "having" does not exclude other elements, and the indefinite article "a" does not exclude a plurality. The fact alone that certain features are mentioned in different dependent claims does not limit the subject matter of the invention. Combinations of these features may also be advantageously used. The reference numerals in the claims are not to limit the scope of the claims.

While the invention was illustrated and described in detail in the drawings and the preceding description, such illustrations and descriptions are intended to be illustrative or exemplary only, and not restrictive, so that the invention is not limited by the embodiments disclosed. In the claims, the word "having" does not exclude other elements, and the indefinite article "a" does not exclude a plurality. The fact alone that certain features are mentioned in different dependent claims does not limit the subject matter of the invention. Combinations of these features may also be advantageously used. The reference numerals in the claims are not to limit the scope of the claims.

The invention claimed is:

1. A coupling member for coupling two modules with each other, comprising:
   a coupling portion comprising a coupling rim and at least two hook members disposed on the coupling rim,
      the coupling portion substantially corresponding in its outer contour to a spherical segment of a sphere with a predetermined spherical radius,
      the coupling rim representing a circular disk of the spherical segment, and
      an outer radius of the coupling rim being smaller than or equal to the spherical radius,
      the at least two hook members, in a lateral view, at least partially following the outer contour of a spherical cap of the spherical segment,
      the at least two hook members being engageable with the hook members of a coupling portion of a second, identical coupling member,
   wherein an axis through the center point of the circular disk of the spherical segment and a center point of the sphere forms a rotational axis, and,
   wherein along the rotational axis from the coupling rim to the at least two hook members, a distance from the outer contour of the coupling portion to the rotational axis decreases in size.

2. The coupling member according to claim 1, wherein the coupling portion has a concave recess which, in a coupled state, corresponds in its shape at least partially to the contour of the spherical cap of a coupled coupling member.

3. The coupling member according to claim 1, wherein the respective hook member has a lower leg and an upper leg disposed thereon, wherein the lower leg is attached to the coupling rim and the respective lower and upper legs are arranged relative to one another such that together they form one hook, respectively, wherein the at least two hook members are disposed in a circular shape around a center point of the coupling rim.

4. The coupling member according to claim 1, wherein the at least two hook members are disposed around the rotation axis so as to be radially spaced apart and rotatable.

5. The coupling member according to claim 4, wherein the coupling portion comprises a locking member, which is displaceable parallel to the rotational axis into the recess and is configured to block a rotation of the hook members of the two modules relative to each other in a coupled state.

6. The coupling member according to claim 1, wherein at least the coupling portion is produced by additive manufacturing.

7. An aircraft with at least one coupling member according to claim 1.

8. A coupling system with a coupling member of a first module and a coupling member of a second module, in each case in accordance with claim 1, wherein in a coupled state, the rotational axes of both coupling members align with each other and the hook members of the coupling member of the first module engage the hook members of the coupling member of the second module and vice versa.

9. The coupling system according to claim 8, wherein in a coupled state, a locking member of at least one coupling member is displaceable parallel to the rotational axis in a direction towards the coupled coupling member, wherein the locking member is configured to block a rotary movement of the coupled coupling member relative to the at least one coupling member.

10. A method for coupling a first and a second modules with each other, wherein each module has a coupling member and each coupling member has a coupling portion comprising a coupling rim and at least two hook members disposed on the coupling rim, the coupling portion substantially corresponding in its outer contour to a spherical segment of a sphere with a predetermined spherical radius, the coupling rim representing a circular disk of the spherical segment, and an outer radius of the coupling rim being smaller than or equal to the spherical radius, the at least two hook members, in a lateral view, at least partially following the outer contour of a spherical cap of the spherical segment, and the at least two hook members being engageable with the hook members of a coupling portion of a second, identical coupling member, and the method comprising the steps:
   detecting at least one of a distance or a position of a module relative to the other module,
   depending on the detected distance or position of the modules relative to each other, inserting the hook members of the coupling member of the first module into the recess of the coupling member of the second module and vice versa,
   rotating the hook members of the coupling member of the first module, relative to the hook members of the coupling member of the second module and vice versa, by a predetermined angle about a rotational axis,
   depending on the rotation of the hook members, moving at least one locking member of a module linearly along its rotational axis, so that a rotation of the hook members of both modules relative to one another is blocked.

11. A coupling member for coupling two modules with each other, comprising:
- a coupling portion comprising a coupling rim and at least two hook members disposed on the coupling rim,
  - the coupling portion substantially corresponding in its outer contour to a spherical segment of a sphere with a predetermined spherical radius,
  - the coupling rim representing a circular disk of the spherical segment, and
  - an outer radius of the coupling rim being smaller than or equal to the spherical radius,
  - the at least two hook members, in a lateral view, at least partially following the outer contour of a spherical cap of the spherical segment,
  - the at least two hook members being engageable with the hook members of a coupling portion of a second, identical coupling member,
- wherein an axis through the center point of the circular disk of the spherical segment and a center point of the sphere forms a rotational axis around which the at least two hook members are disposed so as to be radially spaced apart and rotatable, and
- wherein the coupling portion comprises a locking member, which is displaceable parallel to the rotational axis into the recess and is configured to block a rotation of the hook members of the two modules relative to each other in a coupled state.

* * * * *